(12) United States Patent
Webster et al.

(10) Patent No.: US 11,639,450 B2
(45) Date of Patent: May 2, 2023

(54) BIOBASED, NON-ISOCYANATE, 2K POLYURETHANE COATINGS PRODUCED FROM POLYCARBAMATE AND DIALDEHYDE CROSSLINKING

(71) Applicant: NDSU RESEARCH FOUNDATION, Fargo, ND (US)

(72) Inventors: Dean C. Webster, Fargo, ND (US); Mukund P. Sibi, Fargo, ND (US); Samantha D. Silbert, Fargo, ND (US); Eric M. Serum, Eau Claire, WI (US)

(73) Assignee: NDSU RESEARCH FOUNDATION, Fargo, ND (US)

( * ) Notice: Subject to any disclaimer, the term of this patent is extended or adjusted under 35 U.S.C. 154(b) by 185 days.

(21) Appl. No.: 16/917,009

(22) Filed: Jun. 30, 2020

(65) Prior Publication Data

US 2021/0102089 A1 Apr. 8, 2021

Related U.S. Application Data

(60) Provisional application No. 62/869,249, filed on Jul. 1, 2019.

(51) Int. Cl.
*C09D 175/12* (2006.01)
*C09D 175/06* (2006.01)
*C08G 71/04* (2006.01)

(52) U.S. Cl.
CPC ......... *C09D 175/12* (2013.01); *C09D 175/06* (2013.01); *C08G 71/04* (2013.01)

(58) Field of Classification Search
None
See application file for complete search history.

(56) References Cited

U.S. PATENT DOCUMENTS

| 8,653,174 | B2 | 2/2014 | Anderson et al. |
| 9,580,622 | B2 | 2/2017 | Anderson |
| 9,604,721 | B2 | 3/2017 | Popa |
| 9,718,990 | B2 | 8/2017 | Li |
| 9,822,280 | B2 | 11/2017 | Spilman |
| 2011/0313091 | A1* | 12/2011 | Argyropoulos ...... C09D 175/04 524/391 |
| 2015/0159041 | A1* | 6/2015 | Li .................. C08G 71/04 427/160 |
| 2018/0022956 | A1 | 1/2018 | Kamber |

OTHER PUBLICATIONS

Raquez et al., "Thermosetting (bio) materials derived from renewable resources: a critical review," Prog. Polym. Sci. 2010, 35(4):487-509.
Guan et al. "Progress in study of non-isocyanate polyurethane," Ind. Eng. Chem. Res. 2011, 50(11):6517-6527.
(Continued)

*Primary Examiner* — Satya B Sastri
(74) *Attorney, Agent, or Firm* — Raphael Bellum PLLC

(57) ABSTRACT

The invention relates to curable non-isocyanate polyurethane coating compositions which is the reaction product of a polycarbamate resin and a dialdehyde. The invention also relates to methods of making and using the curable coating compositions of the invention. The invention also relates to objects coated with the curable coating composition of the invention.

19 Claims, 11 Drawing Sheets

(56) References Cited

OTHER PUBLICATIONS

Maisonneuve et al., "Isocyanate-free routes to polyurethanes and poly (hydroxy urethane)s," Chem. Rev. 2015, 115(22):12407-12439.
Ihata et al., "Synthesis of Thermoresponsive Polyurethane from 2-Methylaziridine and Supercritical Carbon Dioxide," Angew. Chem. Int. Ed. 2004, 43(6):717-719.
Brocas et al., "Controlled synthesis of polyepichlorohydrin with pendant cyclic carbonate functions for isocyanate-free polyurethane networks," J. Polym. Sci., Part A: Polym. Chem. 2011, 49(12):2677-2684.
Webster et al., "Synthesis and applications of cyclic carbonate functional polymers in thermosetting coatings," Prog. Org. Coat. 2000, 40(1-4):275-282.
Webster, "Cyclic carbonate functional polymers and their applications." Prog. Org. Coat. 2003, 47(1):77-86.
Datta et al., "Progress in non-isocyanate polyurethanes synthesized from cyclic carbonate intermediates and di- or polyamines in the context of structure-properties relationship and from an environmental point of view," Polym. Bull. 2015, 73(5):1459-1496.
Ubaghs et al., "Novel intramolecular blocked isocyanates as stable one-component systems for poly (urea urethane)s," Polym. 2005, 46(5):1459-1465.
Kwolek et al., "Preparation of polyamides, polyurethanes, polysulfonamides, and polyesters by low temperature solution polycondensation," J. Pol. Sci. Gen. Pap. 1964, 2(6):2693-2703.
Delebecq et al., "On the versatility of urethane/urea bonds: reversibility, blocked isocyanate, and non-isocyanate polyurethane," Chem. Rev. 2012, 113:80-118.
Cornille et al., "A perspective approach to sustainable routes for non-isocyanate polyurethanes," S. Eur. Polym. J. 2017, 87:535-552.
Amarasekara et al., "Renewable resources based polymers: Synthesis and characterization of 2, 5-diformylfuran-urea resin," Eur. Polym. J. 2009, 45(2):595-598.
Moreau et al., "Recent catalytic advances in the chemistry of substituted furans from carbohydrates and in the ensuing polymers," Topics in Cat 2004, 35(31):11-30.
Jang et al., "Novel biobased photo-crosslinked polymer networks prepared from vegetable oil and 2, 5-furan diacrylate," Polym. Adv. Tech. 2013, 24(9):814-818.
Ikezaki et al., "Biobased poly(2,5-furandimethylene succinate-co-butylene succinate) crosslinked by reversible Diels-Alder reaction," J. Polym. Sci., Part A: Polym. Chem. 2013, 52(2):216-222.
Pan et al., "Novel biobased epoxy compounds: epoxidized sucrose esters of fatty acids," Green Chem. 2011, 13(4):965-975.
Pan et al., "High biobased content epoxy-anhydride thermosets from epoxidized sucrose esters of fatty acids." Biomac. 2011, 12(6):2416-2428.
Yan et al., "Thermosets from highly functional methacrylated epoxidized sucrose soyate," Green Mat. 2014, 2(3):132-143.
Kovash et al., "Thermoset coatings from epoxidized sucrose soyate and blocked, bio-based dicarboxylic acids," ChemSusChem 2014, 7(8):2289-2294.
Monono et al., "Pilot scale (10 kg) production and characterization of epoxidized sucrose soyate," Ind. Crops and Prod. 2015, 74:987-997.
Monono et al., "Optimizing process parameters of epoxidized sucrose soyate synthesis for industrial scale production," Org. Process Res. Dev. 2015, 19(11):1683-1692.
Nelson et al., "Highly functional biobased polyols and their use in melamine-formaldehyde coatings," J. Coat. Tech and Res. 2013, 10(6):757-767.
Adamopoulos, "Understanding the formation of sugar fatty acid esters," NC State University Libraries. Master's Thesis in Wood and Paper Science. Aug. 4, 2006.
Murillo et al., "Synthesis and characterization of hyperbranched alkyd resins based on tall oil fatty acids," Prog. Org. Coat. 2010, 69(3):235-240.
Spasojevic et al. "High performance alkyd resins synthesized from postconsumer PET bottles," Advances 2015, (76):62273-62283.
Pan et al., "New biobased high functionality polyols and their use in polyurethane coatings," Chem. Sus. Chem. 2012, 5(2):419-429.

\* cited by examiner

BIOBASED, NON-ISOCYANATE, 2K POLYURETHANE COATINGS PRODUCED FROM POLYCARBAMATE AND DIALDEHYDE CROSSLINKING

CROSS-REFERENCE TO RELATED APPLICATION

This application claims priority to U.S. Application No. 62/869,249, filed Jul. 1, 2019, which is incorporated herein by reference.

STATEMENT OF U.S. GOVERNMENT SUPPORT

This invention was made with government support under grant W911-NF-16-2-0242 awarded by the U.S. Army Research Laboratory (ARL). The U.S. government has certain rights in the invention.

BACKGROUND

Extensive efforts have been made to develop coatings technologies from biorenewable sources justified by environmental and commercial considerations.[1] Polyurethanes are especially notable in these efforts. Bioderived alternatives to components have been sought; additionally, non-isocyanate polyurethane (NIPU) crosslinking systems have been investigated due to concerns regarding worker safety stemming from the synthesis and handling of isocyanates.[2-4] Various approaches to NIPUs have been reported and include ring opening polymerizations (aziridines and cyclic carbonates),[5-8] polyadditions (polycyclic carbonates and polyamines),[5-7] rearrangements (carboxamides and polyols),[9] and many polycondensations (polycarbonate or polychloroformates with polyamines, polyaldehydes or polyols with polycarbamates).[10-12]

Drawbacks from several proposed alternatives stem from a reliance upon phosgene in the preparation of many cross-linkers.[12] Also, as is the case with cyclic carbonate-polyamine crosslinking, room temperature curing is limited.[5,6] Polycarbamate-polyaldehyde crosslinking has recently been touted as an NIPU for its long potlife and fast-ambient cure.[12] However, a significant limitation lies in the lack of readily available polyaldehydes. Publications on this crosslinking system almost entirely consist of a polycarbamate crosslinked with a mixture of 1,3 and 1,4 cyclohexanedicarboxaldehyde (CHDA).[13-18] FIG. 1 shows the reaction between 1,4-CHDA and a polycarbamate. Commonly, the addition of an alcohol to the dialdehyde to form a hemiacetal is utilized to extend the potlife of the reaction. To the best of our knowledge, biomass-derived polyaldehyde crosslinkers have yet to be explored for this NIPU route.

One potential biomass platform comes from carbohydrate-derived 5-(hydroxymethyl)furfural (HMF). HMF has been studied and modified considerably to be utilized as an alternative crosslinker for numerous applications.[19-22] Bio-derived 2,5-diformylfuran (DFF) is available commercially or can be readily synthesized in high purity which makes it an optimal starting point for investigation into totally bio-derived NIPUs. DFF, like CHDA, retains a cyclic structure that can impart rigidity, but it is not derived petrochemically and does not have the same capacity to form enamine type structures.

Polycarbamate resins previously investigated include acrylic-derived materials and also bioderived alkyds made from vegetable oils.[12-18] Epoxidized sucrose soyate (ESS) is a highly functional resin derived from soybean oil and sucrose (FIG. 2). The resultant resin contains a rigid sucrose core, but flexible polyaliphatic chains with approximately 9-11 epoxy sites per molecule that can be modified to polycarbamate sites. With more polycarbamate sites, it is possible to achieve a high crosslink density in the cured material. Modifying epoxy sites on ESS has been extensively studied for a variety of thermosets.[23-29] It has yet to be assessed as a precursor to a bioderived polycarbamate.

The invention describes the synthesis of two bioderived polycarbamates: one a soybean oil-derived alkyd polycarbamate mimicking commercially available materials, and the other novel preparation was derived from ESS. The dialdehydes 1,4-cyclohexane dicarboxaldehyde and biobased 2,5-diformylfuran were synthesized and evaluated as crosslinkers with the respective polycarbamates to form NIPUs of varying biobased content. The curing and material properties of the resultant NIPUs investigated a completely bioderived pathway for polycarbamate-polyaldehyde curing with DFF and compared it to the more common dialdehyde crosslinking option for this technology: CHDA.

SUMMARY OF THE INVENTION

The invention relates to curable non-isocyanate polyurethane coating compositions which is the reaction product of a polycarbamate resin and a dialdehyde.

The invention also relates to methods of making and using the curable coating compositions of the invention.

The invention also relates to objects coated with the curable coating composition of the invention.

DETAILED DESCRIPTION

Figure 1:
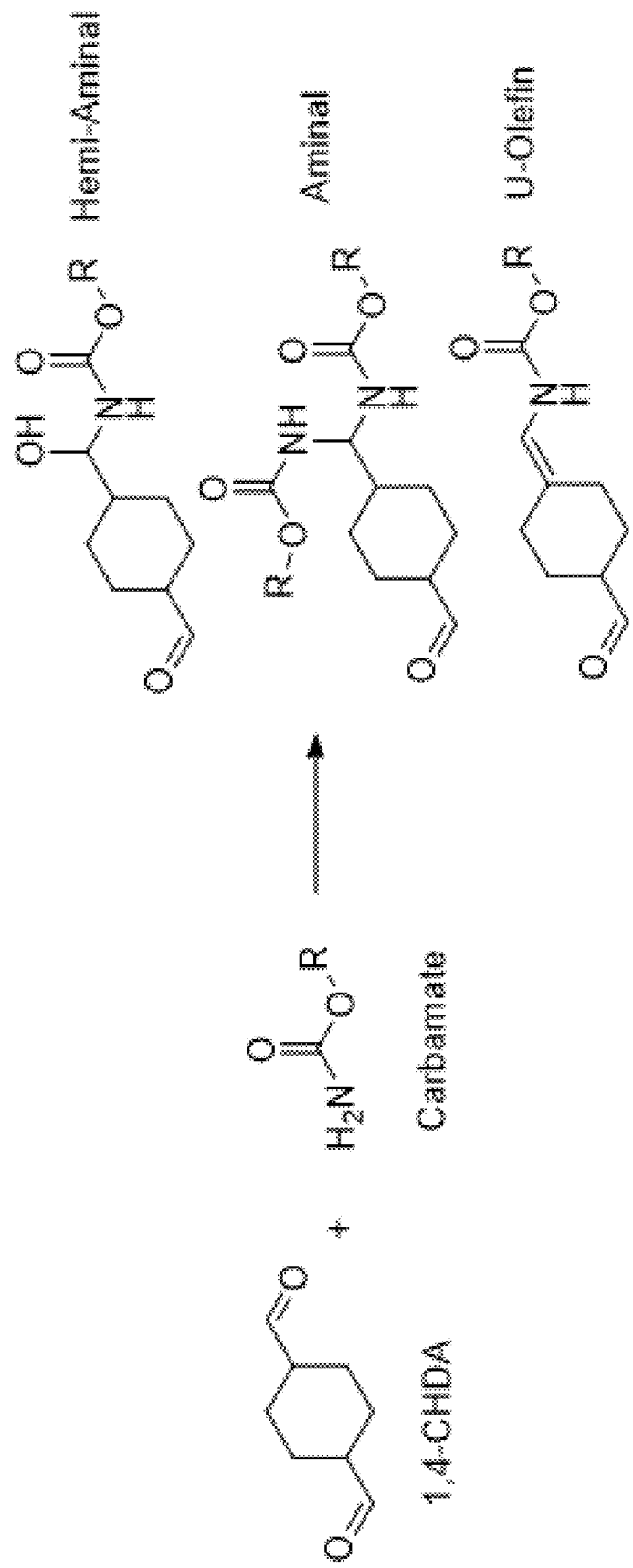
FIG. 1 depicts the reaction between 1,4-CHDA reacting with a carbamate.
Figure 2:
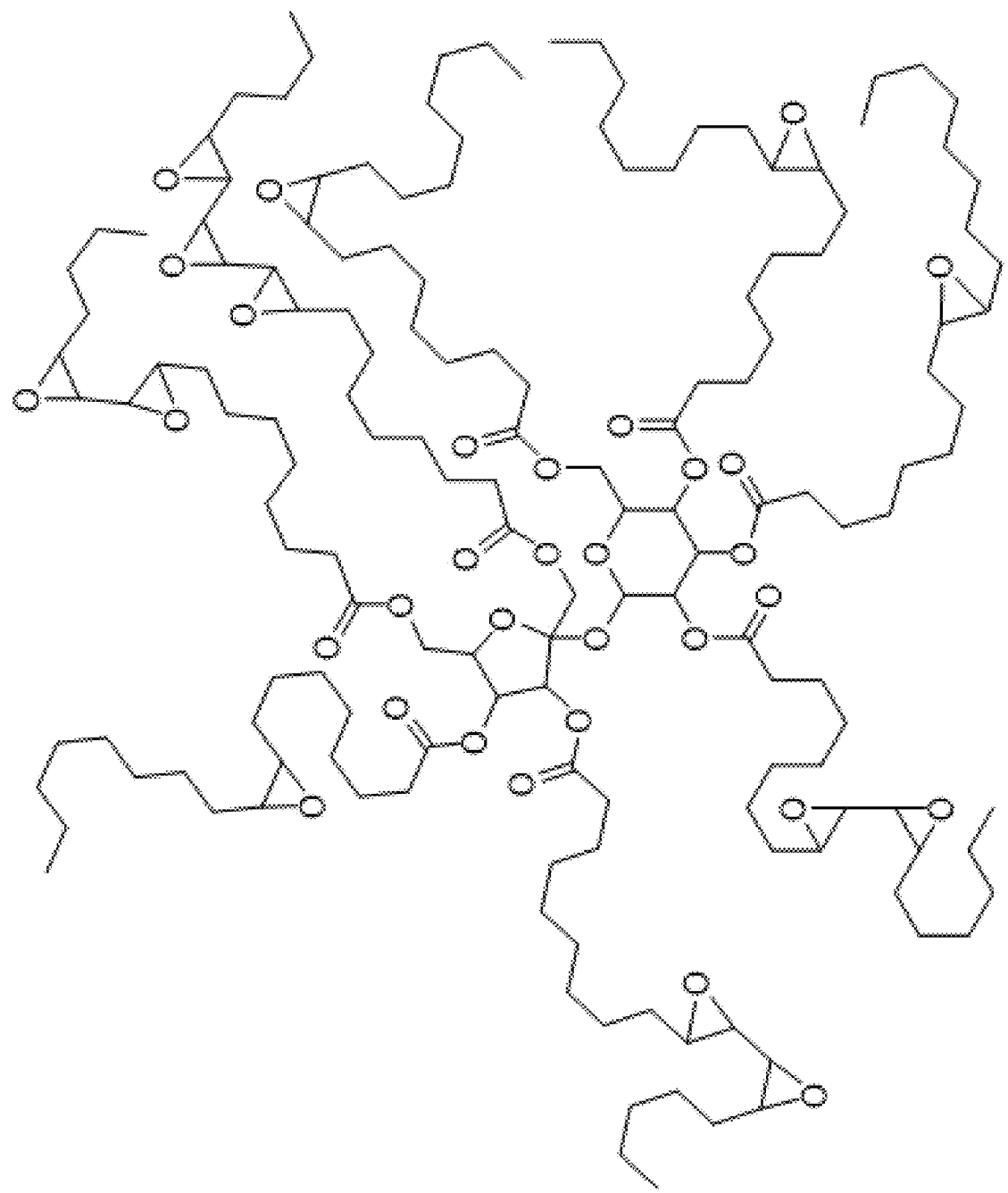
FIG. 2 depicts a representative structure of Epoxidized Sucrose Soyate (ESS).

The invention relates to a curable non-isocyanate polyurethane coating composition comprising, consisting essentially of, or consisting of the reaction product of:
a) a polycarbamate resin; and
b) a dialdehyde.

The polycarbamate resin may be, for example, a transcarbamoylated methoxy sucrose polyol or a transcarbamoylated soybean oil alkyd polyol.

The polycarbamate resin may comprise, consist essentially of, or consist of the reaction product of a polyol resin and a carbamate. The polyol resin may be, for example, a methoxy sucrose soyate polyol or a soybean oil alkyd polyol. The methoxy sucrose soyate polyol may comprise, consist essentially of, or consist of the reaction product of epoxidized sucrose soyate and methanol. The soybean oil alkyd polyol may comprise, consist essentially of, or consist of the reaction product of soybean oil and pentaerythritol. The carbamate may be, for example, methyl carbamate.

The dialdehyde may be, for example, bio-derived or petro-derived. The petro-derived dialdehyde may be, for example, 1,4-cyclohexane dicarboxaldehyde. The bio-derived dialdehyde may be, for example, 2,5-diformylfuran.

The polycarbamate and the aldehyde may be present, for example, in ratio ranging from 1.5:1 to 1:1.5, preferably 1:1.

The invention also relates to a coating composition comprising, consisting essentially of, or consisting of the curable non-isocyanate polyurethane coating composition of the invention, wherein the curable non-isocyanate polyurethane coating composition is cured at ambient conditions or by heating.

The invention also relates to an object coated with the coating composition of the invention.

The invention further relates to a method of making the curable non-isocyanate polyurethane coating composition of the invention comprising, consisting essentially of, or consisting of the steps of:
a) reacting the polyol resin with the carbamate to make the polycarbamate resin; and
b) reacting the polycarbamate resin with the dialdehyde.

Examples:

Materials

Epoxidized sucrose soyate was synthesized as previously reported.[24,25] It was received with an epoxy equivalent weight of 253 g/eq as elucidated by ASTM D 1652. Refined, bleached, deodorized, soybean oil was obtained from Cargill. Methyl carbamate, 2-nitrophenol, dibutyltin oxide, 2-chloro-1,3,2-dioxaphospholane, chromium (III) acetylacetonate, pyridinium chlorochromate (PCC), and 1,4-cyclohexane diol were obtained from Sigma Aldrich. Isophthalic acid, phthalic anhydride, pentaerythritol, tetrafluoroboric acid solution (TFBA), and solvents were obtained from VWR International. K-Cure 1040 para-toluenesulfonic acid solution (40% in IPA) was obtained from King Industries. 5-Hydroxymethyl furfural (HMF) was purchased from AvaBiochem. Manganese dioxide was purchased from Acros Organics.

Synthesis of Methoxy Sucrose Soyate Polyol (MSSP)

The ring-opening of ESS with methanol to produce MSSP was completed using a method reported in Nelson et al.[26] In a one liter, 3-neck round bottom flask equipped with thermocouple, overhead mechanical stirrer, and addition funnel, 215 g methanol, 3.75 g of 48% wt TFBA solution, and 13.4 g DI water were added. The mixture was heated to 50° C. and dropwise addition of 200 g of epoxidized sucrose soyate dissolved in 100 g of chloroform commenced at a rate of 2 mL/min. After completing the addition, the temperature was held for 20 more minutes and then cooled to room temperature. Sodium bicarbonate solution was added and the mixture stirred for 20 more minutes. Stirring was then halted and the mixture phase separated overnight. The following day, the top layer in the flask was removed and the resin was diluted with dichloromethane (DCM) and transferred to a 1 L reparatory funnel. The mixture was washed 8 times with DI water or until a pH strip placed into the removed water post-separation read a neutral pH. Solvent was removed via rotary evaporation and the transparent resin stored. The resin's OH equivalent weight (OHEW) was assessed by $^{31}P$ NMR method noted below.

Synthesis of Soybean Oil Alkyd Polyol (AP)

In a 1 L resin kettle with overhead mechanical stirring, thermocouple, a Dean-Stark trap, reflux condenser, and $N_2$ inlet, 347.2 g of soybean oil, 178.4 g pentaerythritol, and 0.63 g of dibutyltin dioxide were added. The mixture was heated to 220° C. under a gentle $N_2$ blanket. The methanol test was performed every 2 hours, and upon passing the resin was let to cool to 100° C. Then, 89.75 g isophthalic acid, 134.63 g phthalic anhydride, and 4% wt xylenes (based on charge) were then added to the kettle. The temperature of the mixture was gradually increased 10° C. at a time before reaching 220° C. Acid number was collected when little/no water was being collected in the Dean-Stark trap. When acid number titration showed a value of ≤8 mg KOH/g the heating was turned off and, upon cooling, the resin was poured into a glass jar $N_2$. Hydroxyl Equivalent Weight (OHEW) was assessed by $^{31}P$ NMR method.

Transcarbamoylation of Polyol Resins

In a 250 mL round bottom flask equipped with overhead mechanical stirrer, Dean-Stark trap, thermocouple, reflux condenser, and $N_2$ inlet, the respective polyol, methyl carbamate (1.5 eq carbamate: OH content of resin), and dibutyltin oxide at 0.6% wt of the added solids were charged. Next, the added mixture was diluted to 70% solids with xylenes and heating commenced to 150° C. The reaction was held at this temperature for 8 hours before being allowed to cool at RT overnight. Methanol was collected and monitored in the Dean-Stark trap. The following day, the reaction was reheated to 150° C. and held for another 8 hours. The reaction was stopped and allowed to cool to RT before being dissolved in DCM and transferred to a 1 L reparatory funnel. The resin was then washed 5 times with DI water before rotary evaporation. The disappearance of excess methyl carbamate was confirmed with $^{13}C$ NMR and Carbamate Equivalent Weight (CEW) was elucidated with the $^{31}P$ NMR method.

Synthesis of 1,4-Cyclohexane Dicarboxaldehyde (CHDA)

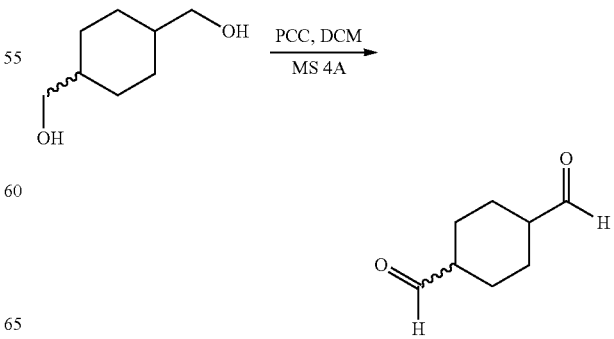

To a 1L round bottomed flask was added 1,4-cylohexanedimethanol (7.7156 g, 0.0535 mol), 64 g of oven dried MS 4 Å, a magnetic spinbar, and dry dichloromethane (350 mL). A solid addition auger was charged with a loosely ground mixture of pyridinium chlorochromate (34.37 g, 0.159 mol) and basic alumina (65 g). The headspace of the flask was flushed with a balloon filled with argon. Under that argon balloon, the oxidizing alumina mixture was added bit by bit. Approximately 25% of the oxidizer was added in 20 minutes in continuous fashion. A slight exotherm was observed (19° C. to 25° C.) over that time. The mixture was allowed to stir for 20 minutes without further additions. Another 25% of the oxidizing mixture was added in 10 minutes and the temperature of the outer wall of the flask again climbed to 25° C. The mixture was stirred for 20 minutes without addition. This process was repeated until all the oxidizing agent was consumed. The mixture was stirred for 1 h. The crude product was purified by column chromatography to provide cyclohexanedicarboxaldehyde (CHDA, 2.22 g, 29%).

Figure 3:
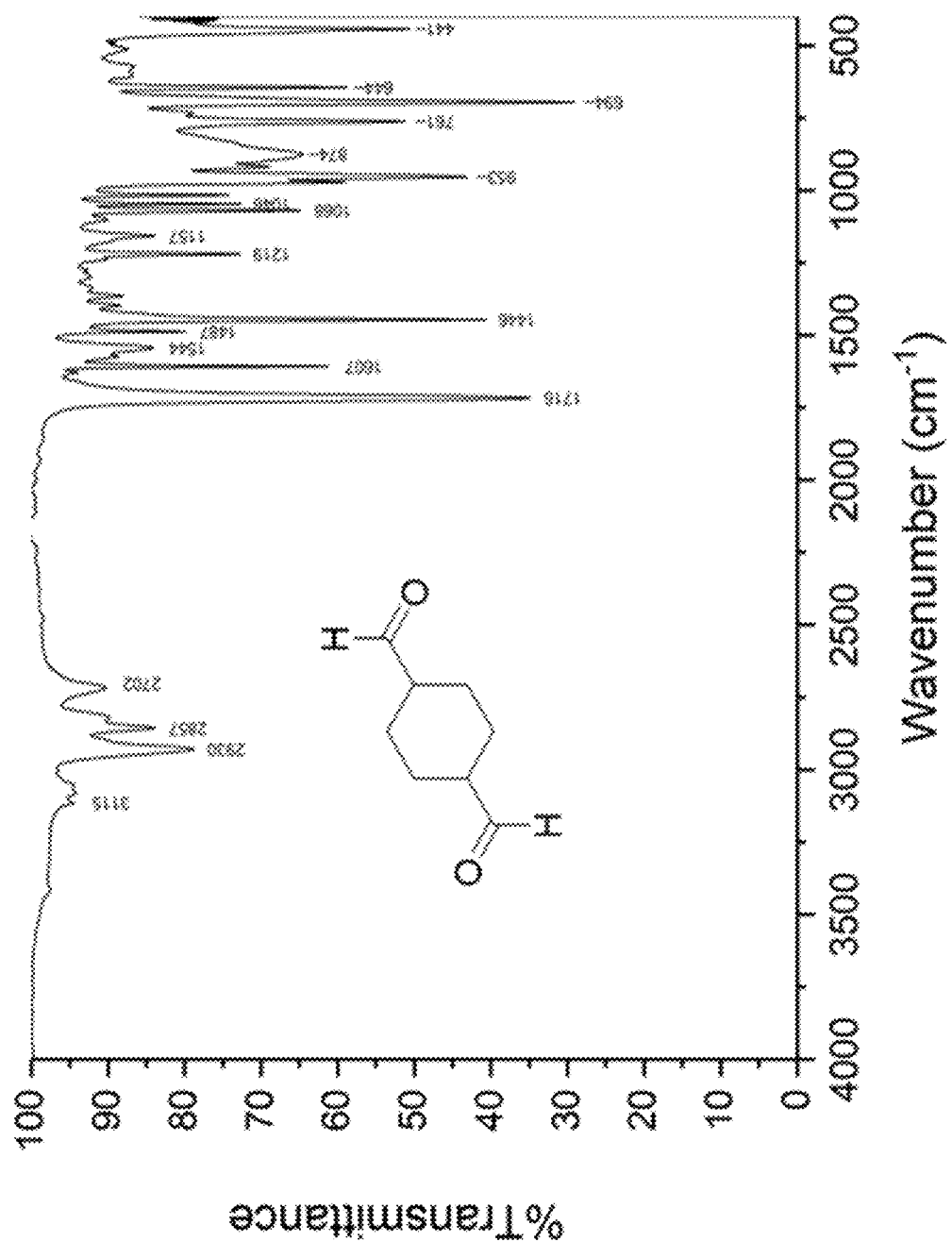
FIG. 3 depicts an FTIR spectra of 1,4-cyclohexanedicarboxaldehyde.
Figure 4:
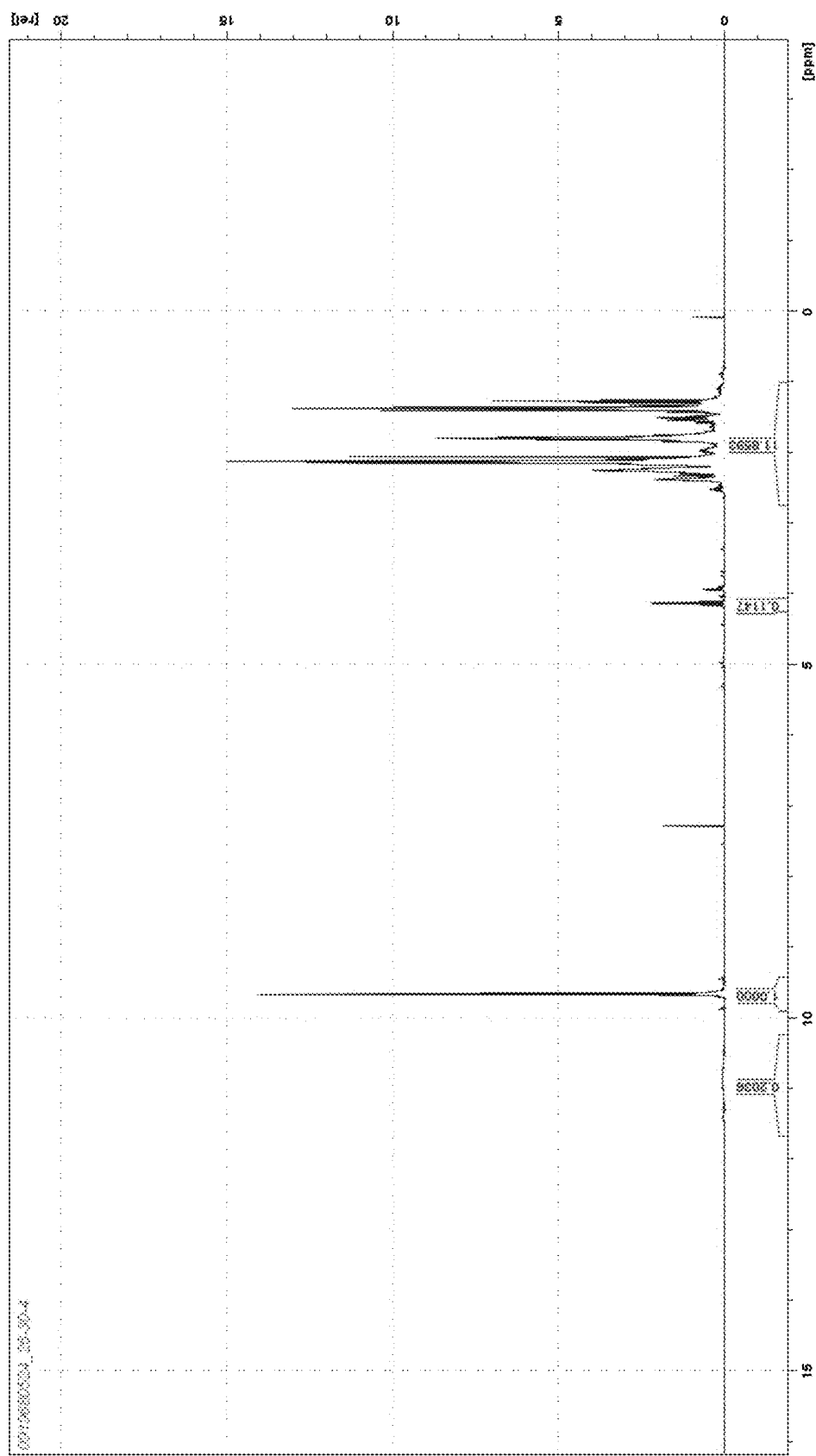
FIG. 4 depicts an $^1$H NMR spectrum of 1,4-cyclohexanedicarboxaldehyde after column chromatography.

FIG. 3 shows the FTIR spectrum and FIG. 4 shows the NMR spectrum of the product.

Synthesis of 2,5-diformylfuran (DFF)

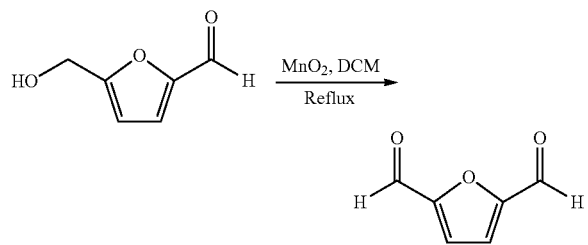

To a 1.0 L 24/40 was added 5-hydroxymethylfurfural (32.73 g of 95% purity from AVA Biochem, 247 mmol), dichloromethane (300 mL), and a long and flat PTFE coated magnetic spinbar. The flask was fitted with a Claisen adapter and a pressure equalizing-jointed solid addition auger. A heavier than water Dean-Stark trap was affixed to the side neck below. The dichloromethane solution was heated to distillation. When the trap was half-filled with distillate, the heat was stopped, and the solid addition auger was charged with manganese dioxide (97 g, 88% active electrolytically precipitated from Acros Organics, 0.982 mmol, 4 equiv). The mixture was heated to distillation and the oxidizer was added in portions over the course of 6 h. Each addition of oxidizer was directly followed by the evolution of wet distillate. The combined reaction mixture was distilled for 12 h, then diluted while still hot with ethyl acetate (100 mL). The hot mixture was suction filtered through a finely fritted glass Buchner funnel half charged with silica gel. The mixture crystallized upon contacting the filter flask; ethyl acetate was used to rinse the filter pad free of the crystallized product. The filtrate was concentrated by rotary evaporation to remove dichloromethane, diluted to form a complete solution with ethyl acetate, then filtered through a fresh pad a silica gel to isolate the bright yellow solution. The complete yellow solution was concentrated by rotary evaporation to afford yellow solid which was dried in air overnight. The crude was recrystallized from isopropanol to give 25.40 g or 67% of DFF (mp=115-118° C.).

Figure 5:
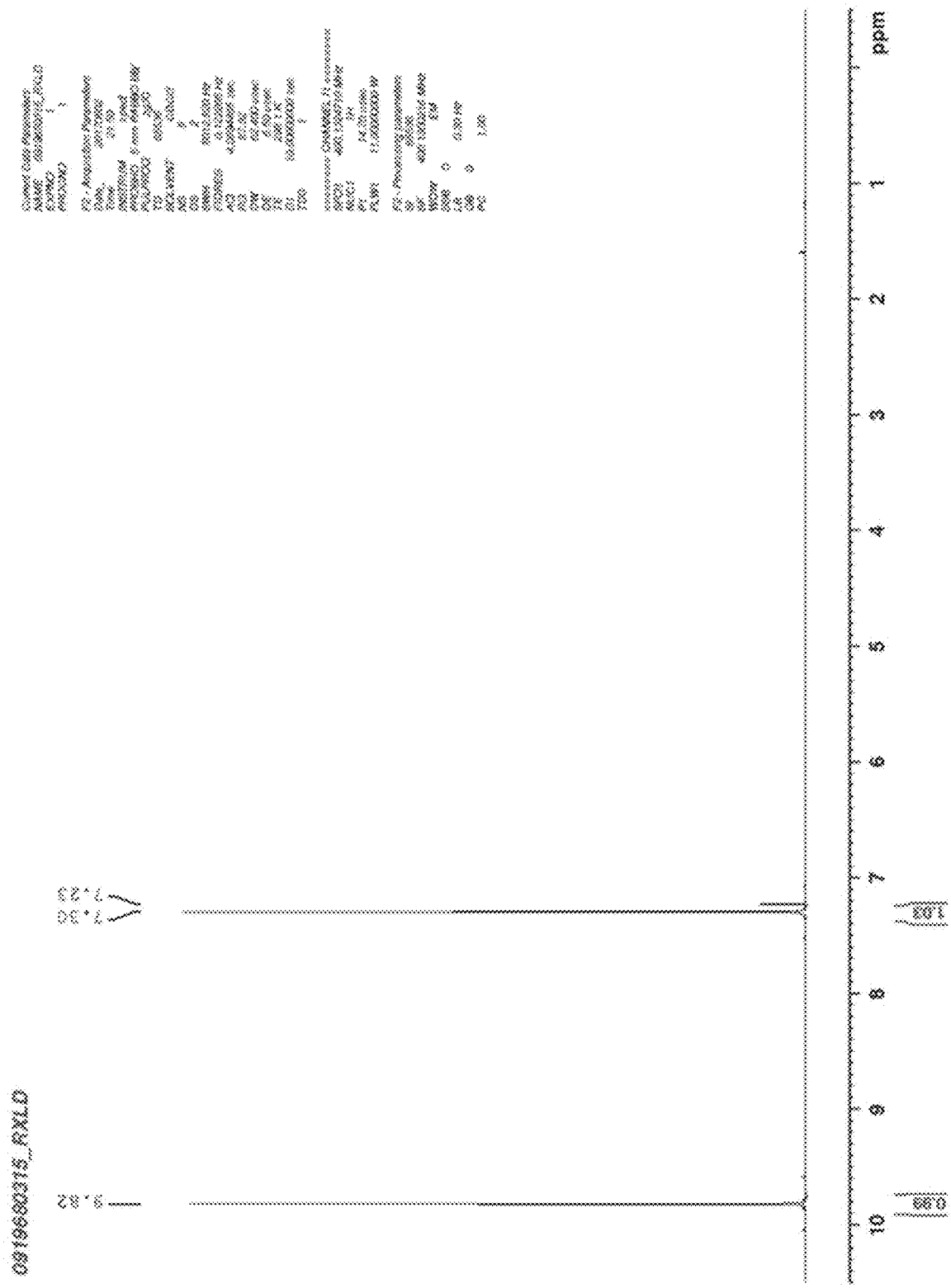
FIG. 5 depicts an $^1$H NMR spectrum of 2,5-furandicarboxyldehyde recrystallized from 2-propanol.

FIG. 5 shows the proton NMR spectrum of the purified DFF.

$^{31}$P NMR Procedure to Determine Hydroxyl Content of Resins

The procedure was developed from a method stated in Adamopoulos et al.[27] In a glass vial, 15-20 mg of resin was weighed out. To this vial, 500 μL of a 50/50 by weight Pyr/CDCl$_3$ mixture was added. The internal standard, 2-nitrophenol, was dissolved in a separate vial at 10-16 mg in 1 mL Pyr/CDCl$_3$ mixture to make the internal standard solution. Of this solution, 100 μL was then added to the sample vial. In another separate vial, 11.4 mg of chromium (III) acetylacetonate was added and dissolved in 1 mL weight Pyr/CDCl$_3$ mixture and 50 μL of this solution added to the sample vial. 2-Chloro-1,3,2-dioxaphospholane (CDP) was added to the sample vial at 3:1 by volume reagent:estimated hydroxyl content of resin to ensure complete reaction of OH groups. Contents of the vial was transferred by micropipet into a Wilmad™ NMR sample tube of outer and inner diameters of 5 mm and 4 mm respectively and 7″ length. $^{31}$P NMR analysis was completed on an ECA Series 400 MHz NMR Spectrometer with lock on No Solvent before running analysis. Samples were completed in duplicate and values averaged.

Gel Permeation Chromatography (GPC)

GPC analysis of the resins was completed on an EcoSEC HLC-8320GPC from Tosoh Bisocience with a differential refractometer detector. Around 10 mg of sample was thoroughly dissolved in 1.5-2 mL of tetrahydrofuran (THF) in a vial. This was then filtered through a 0.45 mm PTFE filter before being run. THF was used as to elute the samples at flow rate Of 0.35 mL/min. An EasiVial polystyrene standard obtained from Agilent was utilized for calibration.

Viscosity Analysis

Rheological analysis was carried out on a TA Instruments™ ARES Rheometer with parallel plate set-up. Sample was loaded between the plates and a gap was set at 1.0 mm. A steady, strain controlled, sweep rate test was completed from 0.1 to 100 rotations per second. Assessments of resin viscosity necessitated dilution to prevent overloading the instrument. Analyses were completed at room temperature with 0.1% strain.

Attenuated Total Reflectance Spectroscopy (ATR)

ATR Spectroscopy was run on a Bruker Vertex 70 Spectrometer with Thermo Fisher Scientific single reflection diamond ATR and HP clamp attachment. Atmospheric background was taken before samples were deposited on the diamond surface. 32 counts across a 400-4500 cm$^{-1}$ range were taken and percent reflectance recorded.

Preparation of Non-Isocyanate Polyurethane Coatings

In a glass vial, the respective dialdehyde, ethanol (1.5 eq ethanol:aldehyde), and K-CURE 1040 (40% para-toluenesulfonic acid in IPA, 3% wt of formulation solids) was added. The mixture was vortexed until the aldehyde fully dissolved. The polycarbamate resin (1:1 aldehyde:carbamate) dissolved in ethyl acetate (~45% solids) was then added to the vial and the formulation vortexed until transparent. The mixture was sonicated for 10 minutes to remove bubbles (1,4-CHDA crosslinked too rapidly so it was drawn down immediately). The formulations were drawn down at 6 mils wet film thickness on Q-Panel aluminum substrates pre-cleaned with IPA and cured under laboratory ambient conditions for 3 months. Concurrently, the same formulations were made and underwent an expedited cure regime of 120° C. for 2 hours for comparison to the ambient-cured networks. Due to issues with formulation at a 1:1 carbamate: aldehyde ratio with transcarbamoylated alkyd polyol (TCAP), specifically involving DFF phase separating after being drawn-down, TCAP was formulated at 1.5:1 carbamate:aldehyde.

Standard Coating Characterizations

% Solids, Konig Pendulum Hardness, Pencil Hardness, Crosshatch Adhesion, Impact Resistance, and Solvent Resistance were respectively completed in accordance with ASTM D2369-10, ASTM D4366, ASTM D3363-05, ASTM D4541-17, ASTM D2794-93, and ASTM D5402-15. Tack free time was determined by placing a cleanly-gloved thumb onto the coating, holding for 30 seconds, and time noted when no resistance was felt when pulling the glove away and no mark was left on the coating. Gel % was ascertained by taking three, 1 g samples of the respective formulations, wrapping them individually in filter paper and placing adjacent to each other in an extraction thimble. The thimble was then placed in a Soxhlet extractor and extracted by DCM reflux at 60° C. for 24 hours. The samples were then dried for several hours in a vacuum oven before being weighed. Final weight/Initial weight of the sample was recorded as the Gel % average of the 3 samples.

Thermal Analysis

Differential Scanning Calorimetry (DSC) was run on a TA Instruments Q1000 Modulated Differential Scanning Calorimeter. ~5 mg of coating was placed in a standard aluminum pan and run under a Heat-Cool-Heat regime first equilibrating at 30° C., heating at 10° C./min to 150° C., cooling 10° C./min to 20° C., then reheating at 10° C./min to 150° C. This was increased to 200° C. if the amplitude of the tan δ signal was near or surpassed that limit. Dynamic Mechanical Analysis (DMA) was run on a TA-Instruments Q800 Dynamic Mechanical Analyzer. Film samples of around 17 mm length, 7 mm width, and 0.05 mm thickness were prepared and locked in the calibrated tension DMA clamps at 2 lbs with a torque wrench. Samples were equilibrated at 40° C. before heating at 2° C./min to 150° C. Instrument was set at 1 Hz oscillating frequency, 0.02 oscillating strain, 0.01 static force, and 125% force track.

Results and Discussion:

Resin Synthesis and Characterization

Figure 6:
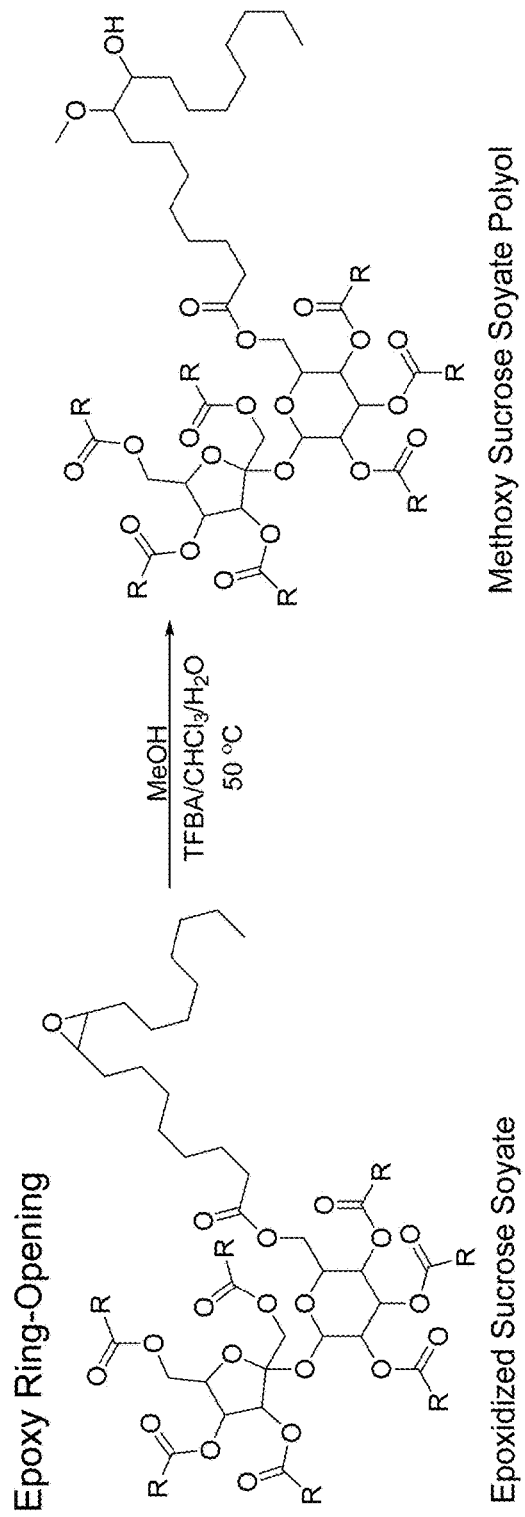
FIG. 6 depicts the synthesis of methoxy sucrose soyate polyol (MSSP) and transcarbamolyated methoxy sucrose soyate polyol (CMSSP) from epoxidized sucrose soyate (ESS).
Figure 6:
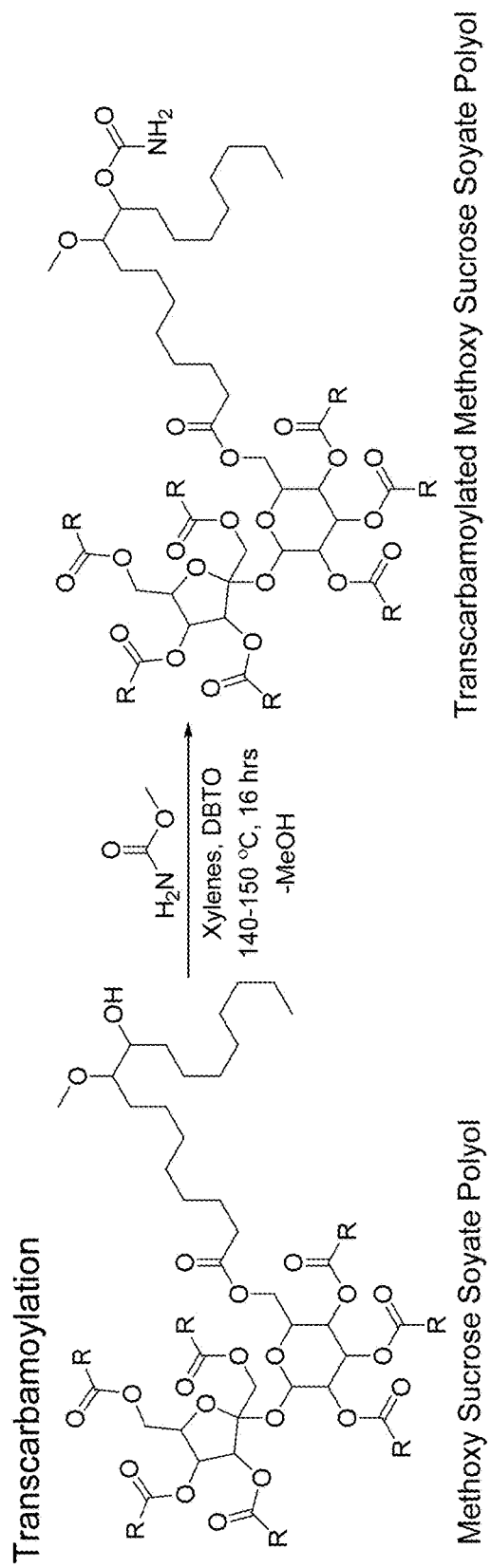

The epoxy ring-opening of ESS with methanol to yield methoxy sucrose soyate polyol (MSSP) and subsequent transcarbamoylation to form transcarbamoylated methoxy sucrose soyate polyol (CMSSP) is shown in FIG. 6. The alkyd polyol (AP) was also transcarbamoylated in a similar fashion to yield TCAP. The calculations of the hydroxyl equivalent weight (OHEW) values elucidated from the integrals of $^{31}P$ NMR signals corresponding to polyol hydroxyls and the internal standard, as well as carbamate conversion and carbamate equivalent weight (CEW) computed from the changes in hydroxyl content are elucidated from the integrals of signals corresponding to polyol hydroxyls and the internal standard and calculated in Equations 1-4. Carbamate conversion and CEW were computed from Equations 5-6.[19] These values as well as the solids content of the resins are seen in Table 1.

OH Content of Sample and Internal Standard via $^{31}PNMR$    Equation 1

$$v_{OHContent} = \frac{\int OH_{Resin}}{\int OH_{Internal\ Standard}} \times \text{mmol Internal Standard}.$$

OH Number of Resin    Equation 2

$$OH\#_{Resin} = \frac{v_{OHContent}}{\text{g Sample}} \times 56.1\left(\frac{g}{mol}\right) = \frac{mg\ KOH}{g\ Sample}.$$

OH Equivalent Weight of Resin    Equation 3

$$OHEW_{Resin} = \frac{56100\frac{mg}{mol}}{OH\#}.$$

Carbamate Conversion of Polycarbamate $Resin^{19}$    Equation 4

$$\text{Carbamate Conversion} = \frac{OH\#_{Polyol} - OH\#_{Polycarbamate}}{OH\#_{Polyol}}.$$

Carbamate Equivalent Weight Of Carbamate $Resin^{19}$    Equation 5

$$\text{Carbamate Equivalent Weight} = \frac{OHEW_{Polyol} + (43 \times \text{Carbamate Conversion})}{\text{Carbamate Conversion}}.$$

TABLE 1

% Solids, Viscosity, OHEW, CEW, and % Carbamate Conversion of Methoxy Sucrose Soyate Polyol (MSSP), Alkyd Polyol (AP), Transcarbamoylated Methoxy Sucrose Soyate Polyol (CMSSP), and Transcarbamoylated Alkyd Polycarbamate (TCAP).

| Resin | % Solids | OHEW (g/eq) | CEW (g/eq) | % Carbamate Conversion |
|---|---|---|---|---|
| MSSP | 99.4 | 216 | N/A | N/A |
| AP | 98.4 | 119 | N/A | N/A |
| CMSSP | 93.9 | 2200 | 282 | 90.4 |
| TCAP | 96.1 | 950 | 181 | 87.9 |

Figure 7:
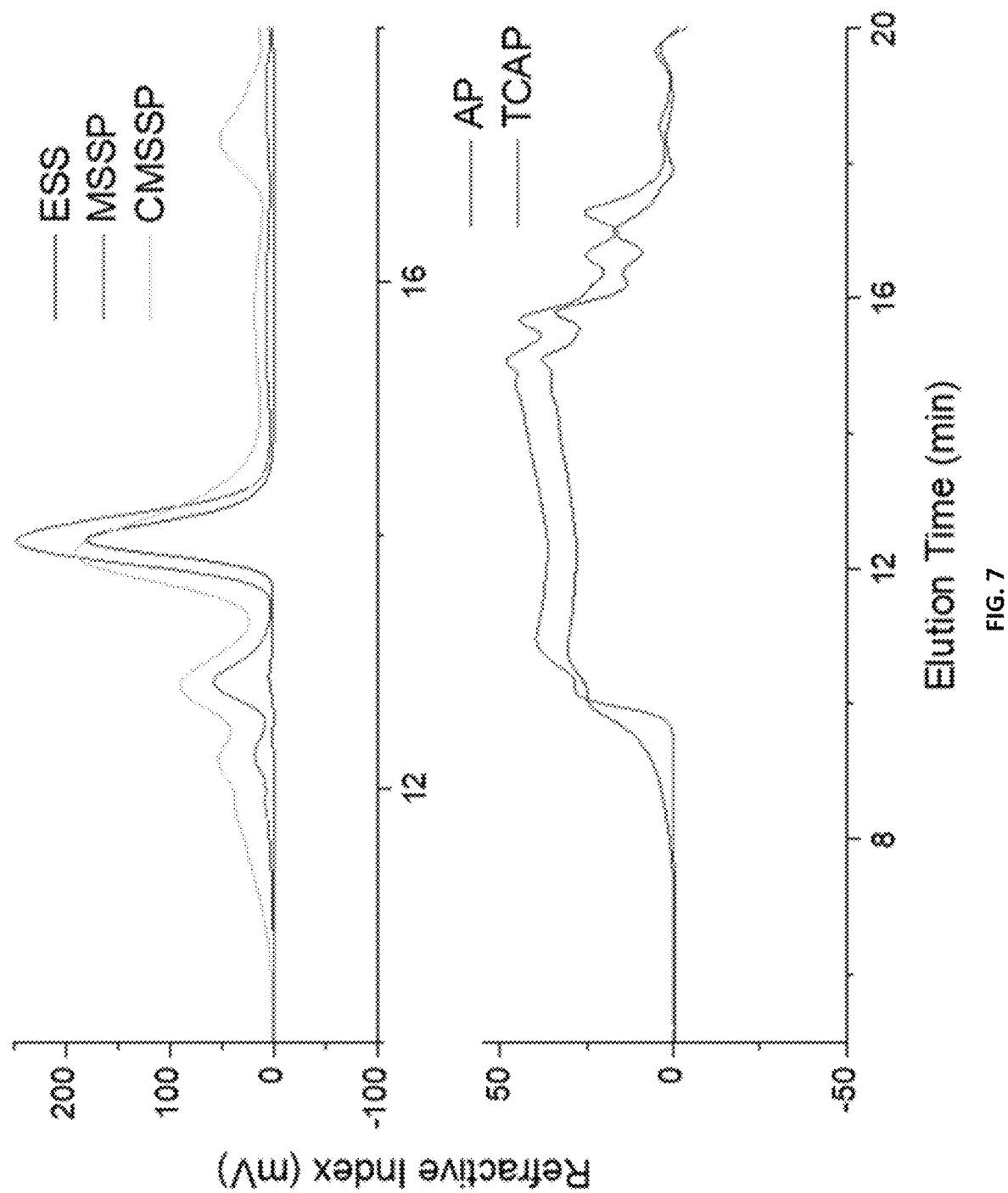
FIG. 7 depicts the gel permeation chromatography graph overlays of the epoxidized sucrose soyate (top) and alkyd-based resins (bottom).

ESS, MSSP, and soybean oil all had a clear and colorless appearance. The alkyd polyol (AP) had a slightly amber appearance which further darkened after transcarbamoylation. CMSSP also had an amber appearance. Gel permeation chromatography analysis overlays are seen in FIG. 7 and the determined values of molecular weight averages alongside their measured viscosity at 50% solids are shown in Table 2. MSSP shows a distinct increase of weight and Z-average molecular weights compared to ESS. The larger molecular weight signals seen in MSSP are the result of oligomeric side reactions with alcohol.29 CMSSP shows further Mw and Mz increases compared to MSSP and retains the same higher molecular weight signals, however, a low molecular weight signal appears. This may be due to transesterification of the esters of the sucrose core with the fatty acids with methyl carbamate. The alkyd polyol and polycarbamate show broad molecular weight distributions which are attributed to the statistical reactions between multifunctional species.[31-32] Post transcarbamoylation, the viscosities of the resins increased substantially, likely due to the introduction of hydrogen-bonding carbamate groups.

TABLE 2

Gel Permeation Chromatography and rheological Analyses of the Resins

| Resin | $M_n$ | $M_w$ | $M_z$ | PDI | Viscosity at 50% solids (cP) |
|---|---|---|---|---|---|
| ESS | 2717 | 2736 | 2754 | 1.007 | 150 |
| MSSP | 1098 | 3336 | 5245 | 3.039 | 290 |
| CMSSP | 1638 | 4422 | 8332 | 2.699 | 32600 |
| AP | 1003 | 4623 | 13932 | 4.61 | 16900 |
| TCAP | 1785 | 9049 | 26266 | 5.07 | 89400 |

Figure 8:
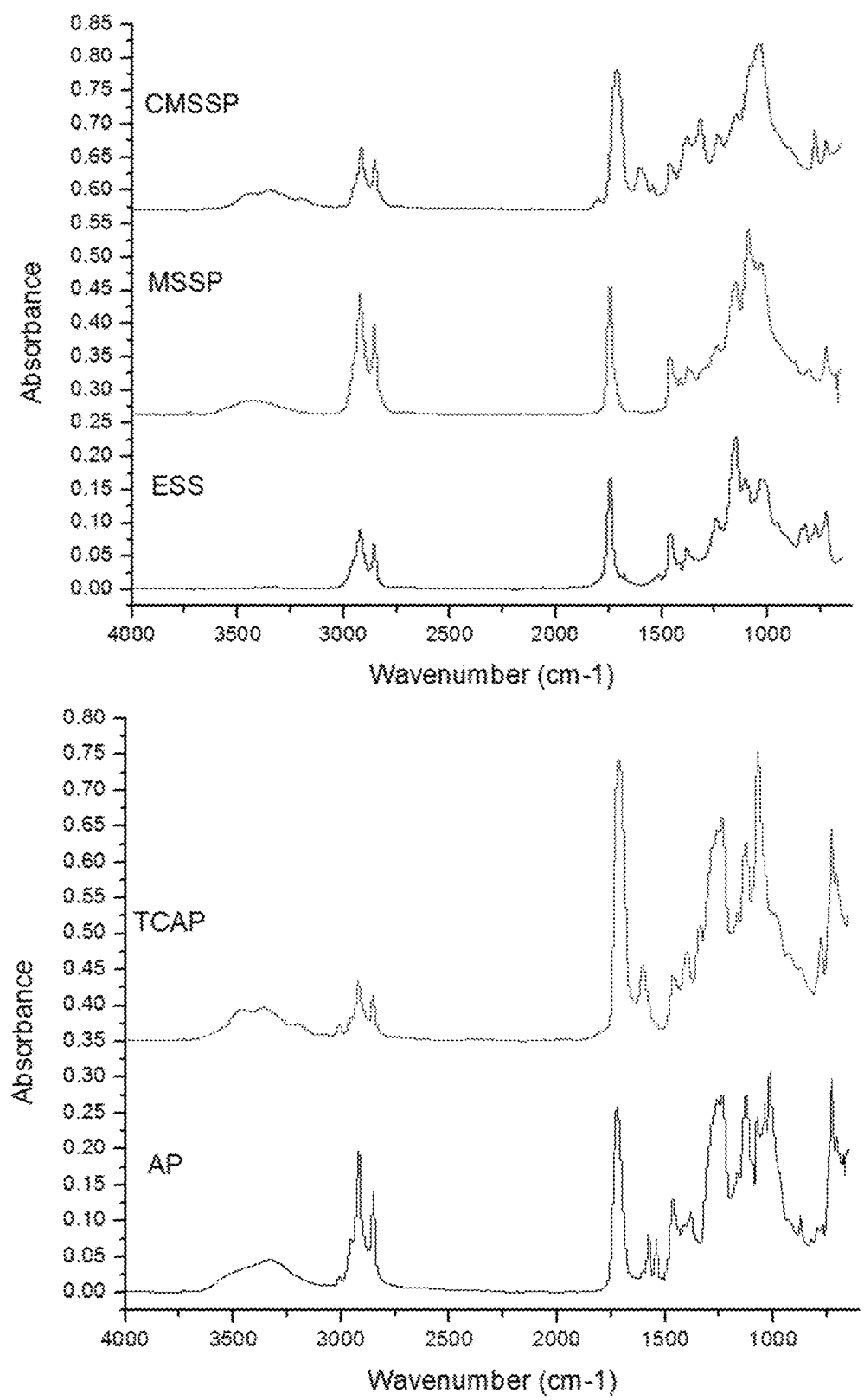
FIG. 8 depicts the FTIR analysis of the resins.

Infrared spectroscopic analyses of the respective resins show the loss of the 826 cm$^{-1}$ oxirane stretching of ESS33 and the appearance of a broad, ~3300 cm$^{-1}$ hydroxyl signal in MSSP (FIG. 8). Upon transcarbamoylation, a signal between ~3200-3500 cm$^{-1}$ appears which indicates amine hydrogens stretching from the carbamate groups. A new carbonyl signal ~1640 cm$^{-1}$ is also present and indicates carbamate carbonyl stretching. The alkyd polyol also shows a broad, 3300 cm$^{-1}$ hydroxyl signal as well as 1500-1630 cm$^{-1}$ signals which indicate the aromatic hydrogens of the phthalates. TCAP demonstrates the ~3200-3500 cm$^{-1}$ N-H and ~1640 cm$^{-1}$ carbamate carbonyl signals as well, however the aromatic signals are no longer visible post-transcarbamoylation.

Characterization of the Coatings

Figure 9:
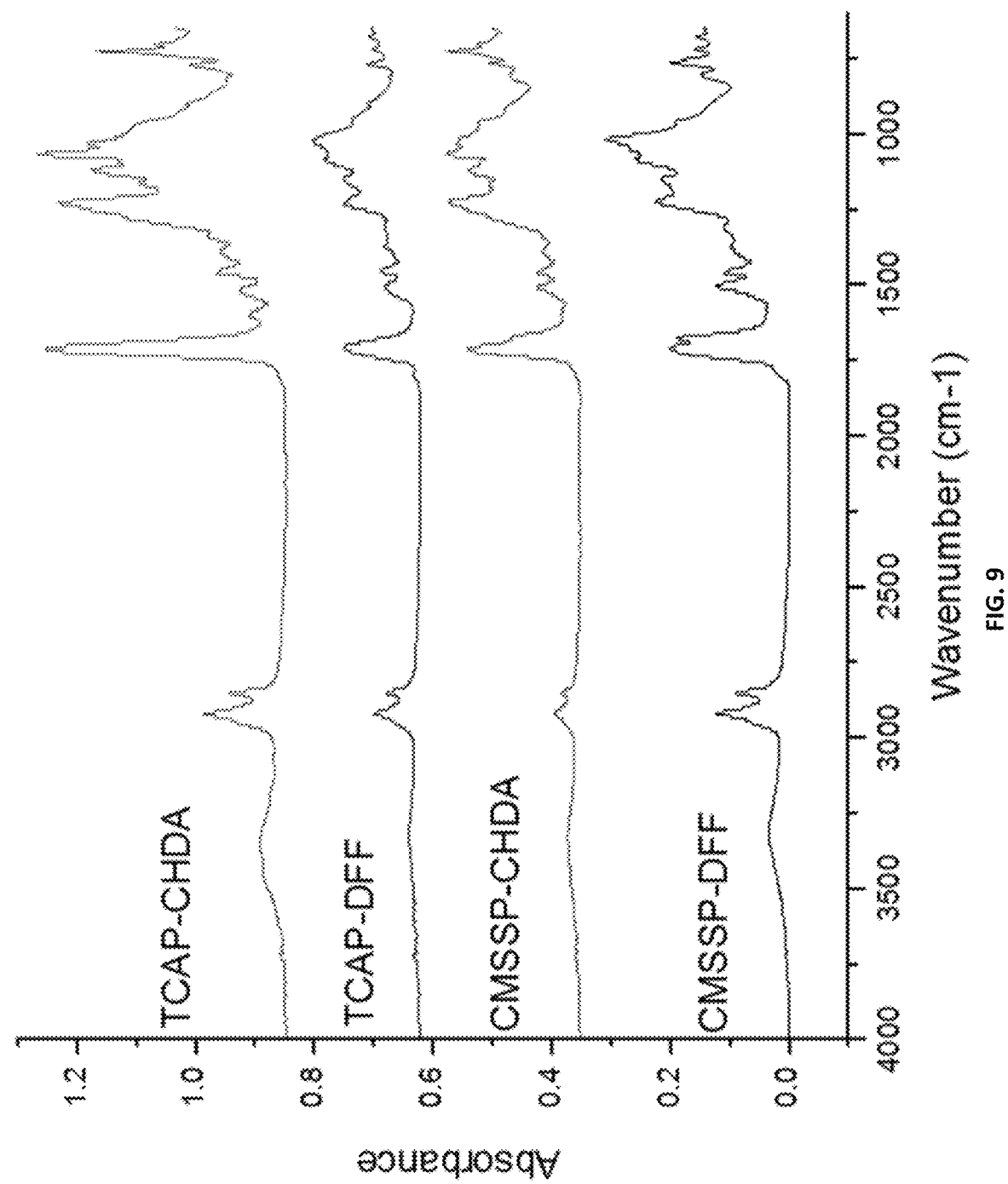
FIG. 9 depicts the ATR-FTIR analysis of the coating formulations post 3-month ambient cure.

Coatings were made by mixing the carbamate functional resins with the dialdehydes and were allowed to cure under ambient conditions for three months. ATR-FTIR spectroscopic analysis of the formulations shows the disappearance of the carbamate amine stretching signals and a shift of the carbamate carbonyl signal (FIG. 9). Slight amine and carbamate carbonyl stretching is still seen in the TCAP formulations which were formulated at 1.5:1 carbamate:aldehyde ratio. A broad ~3300 cm$^{-1}$ signal that is seen more prominently in the DFF-CMSSP formulation may indicate the presence of hydroxyls of hemiaminal linkages. The near loss of this signal in CHDA-CMSSP may indicate that either a full aminal or u-olefin network formed.[13] Both DFF formulations show a carbonyl signal around 1680 cm$^{-1}$ which may indicate that the carbamate carbonyl is now a polyurethane crosslink. This signal is obscured in the CHDA formulations by the carbonyls of the esters of the resins at ~1700 cm$^{-1}$.

Figure 10:
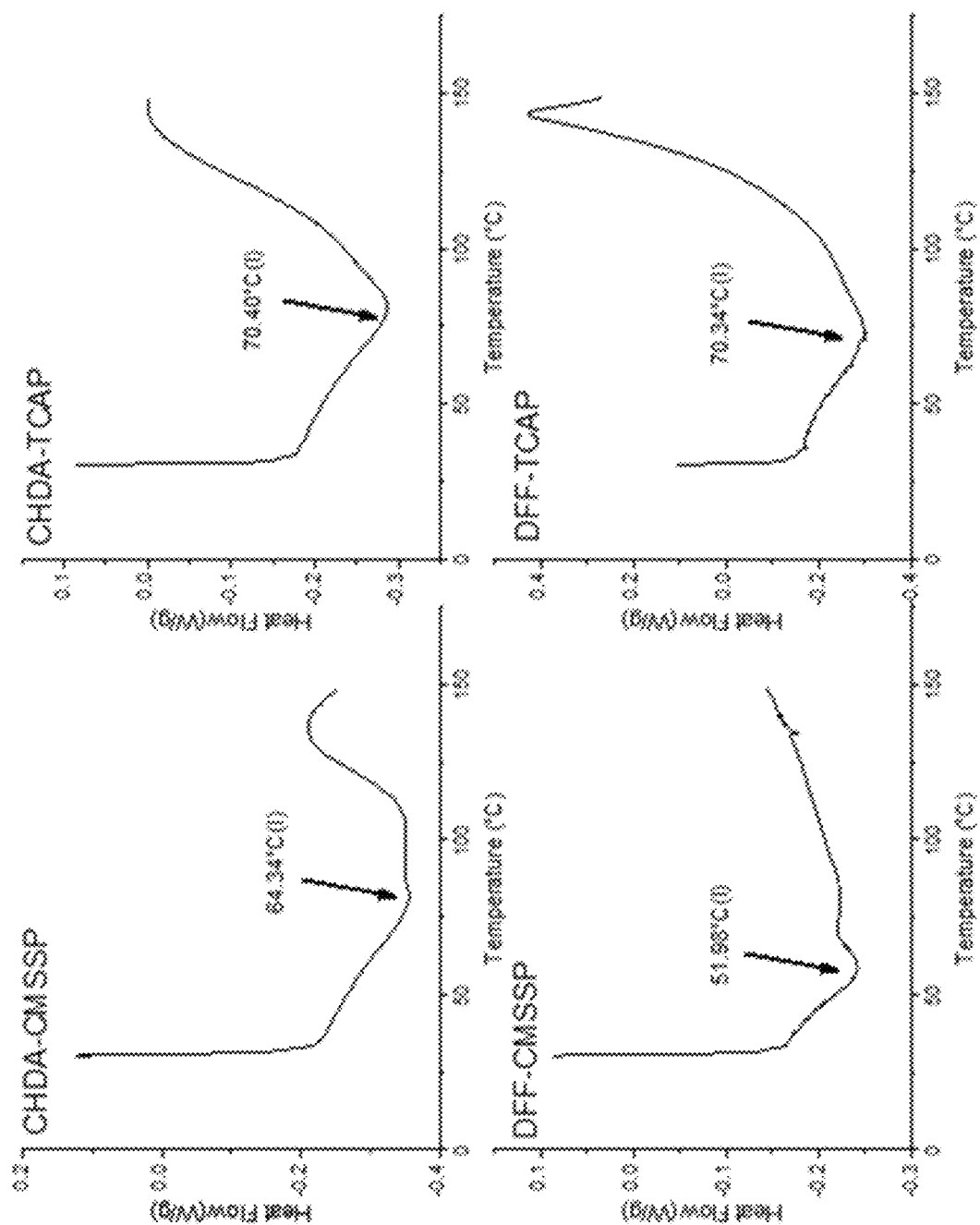
FIG. 10 depicts the Cycle 1 DSC analysis of the coatings.
Figure 11:
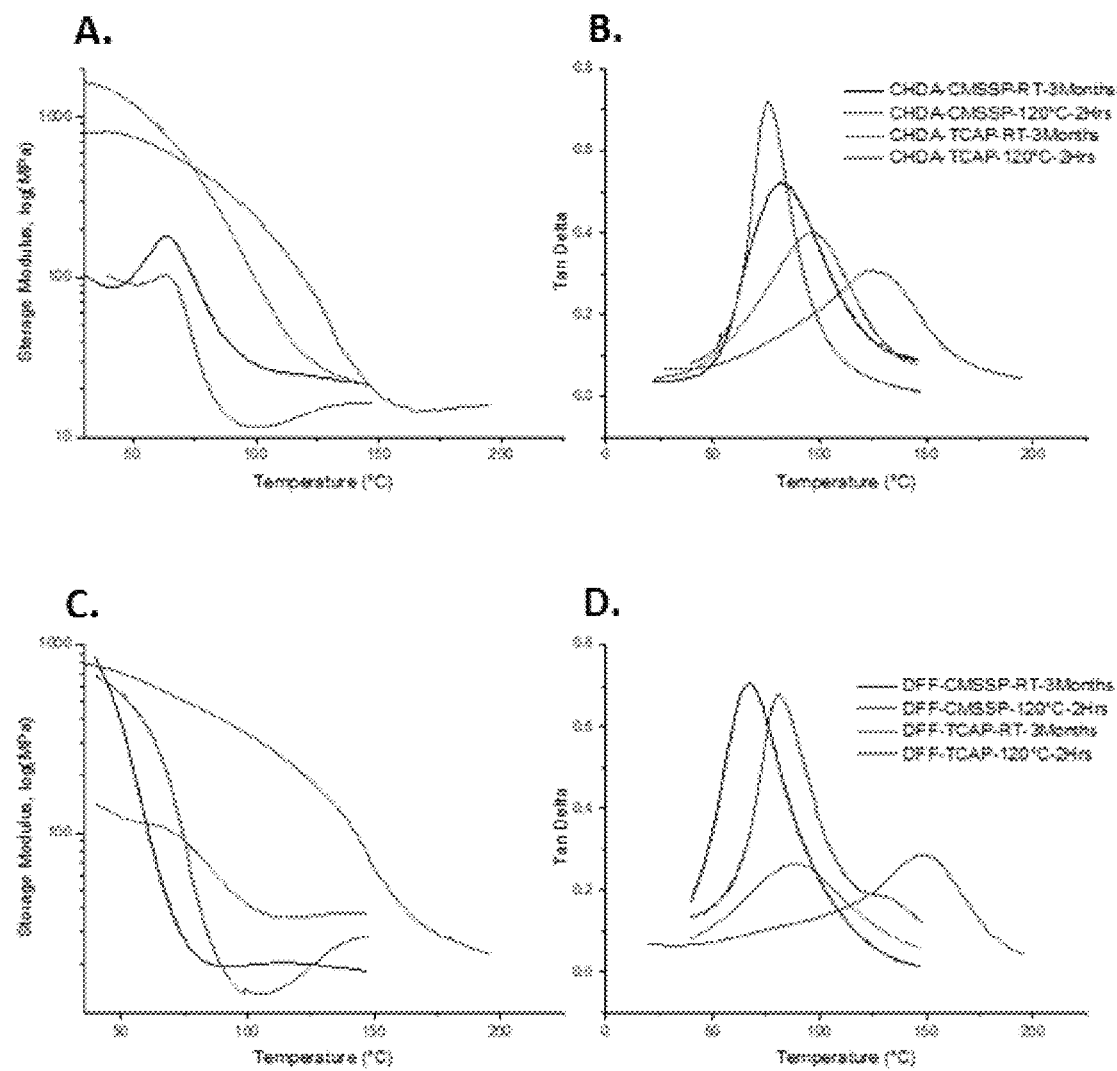
FIG. 11 depicts the DMA Analysis of the coatings. A. Storage Modulus curves of the 1,4-CHDA Formulations. B. tan Delta curves of the 1,4-CHDA Formulations. C. Storage Modulus Curves of the DFF Formulations. D. tan Delta Curves of the DFF Formulations.

Coatings made using DFF had notably more color development when crosslinked with both resins in comparison to the CHDA coatings. DSC analysis of the ambiently-cured coatings is seen in FIG. 10. After ~100° C., a large exotherm occurs indicating that further crosslinking is occurring. The second heating cycle shows no sharply discernable transitions. This may be due to the further high-temperature crosslinking restricting molecular motion so much that a Tg is unable to be elucidated. DMA analysis seen in FIG. 11 shows the storage moduli generally decreasing as temperature increases, however an increase in modulus is seen in the ambiently-cured formulations from 50-70° C.; most visibly those crosslinked with CHDA. This region may indicate that residual crosslinking is occurring. The peak of the tan δ signal can be used to determine the Tgs of the networks. CHDA-CMSSP showed the highest Tg from ambient cure with 81.54° C. with DFF-CMSSP providing the lowest with 67.25° C. DMA was also run on the coatings after they had been cured for 2 hours at 120° C. Their Tgs, reported in Table 3, show the lowest to be DFF-CMSSP at 87.59° C. and the highest to be 149.9° C. with DFF-TCAP. Crosslink densities (ve) and the molecular weight between crosslinks (Mc) were calculated using the theory that the storage modulus in the rubbery plateau, E', follows the relationship E'=3veRT and E'=3ρRT/Mc where T is the temperature at the onset of the rubbery modulus, ρ is the density (assumed to be 1), and R is the gas constant.[34] The crosslink densities (ve) and molecular weights between crosslinks (Mc) for coatings that underwent expedited cure were higher than the ambiently-cured coatings. This is likely due to thermal cure increasing crosslinking. However, the breadth of the tan δ curves is larger for the thermally-cured coatings, indicating inhomogeneity of crosslinking. The 3-month ambiently-cured coatings show narrower tan δ signals, showing that over time, the network becomes more homogenous.

TABLE 3

$T_g$ Values and Crosslink Densities of the Formulations

| Formulation | Cure Schedule | $T_g$ (DMA, ° C.) | E' (MPa) at Rubbery Modulus Onset | $M_c$ (g/mol) | $v_e$ [×10$^3$ mol mm$^{-3}$] |
|---|---|---|---|---|---|
| DFF-CMSSP | 180 days, RT | 67.25 | 19.57 | 471 | 2.12 |
| | 120° C., 2 hours | 87.59 | 35.24 | 277 | 3.62 |
| DFF-TCAP | 180 days, RT | 81.26 | 14.53 | 659 | 1.52 |
| | 120° C., 2 hours | 149.9 | 27.65 | 409 | 2.45 |
| CHDA-CMSSP | 180 days, RT | 81.54 | 21.23 | 492 | 2.03 |
| | 120° C., 2 hours | 96.49 | 21.30 | 490 | 2.04 |
| CHDA-TCAP | 180 days, RT | 75.85 | 11.80 | 801 | 1.25 |
| | 120° C., 2 hours | 125.4 | 16.37 | 653 | 1.53 |

Characterization of the coatings (Table 4) show that all of the formulations were rapidly tack free under ambient conditions. It also shows across the board low impact resistance, low crosshatch adhesion, and König hardness values at or near 100 s indicating the networks are hard and brittle for CHDA and DFF coatings regardless of resin or cure regime. Pencil hardness values improved over time for ambient cure from HB after one week up to F after three months. Coatings made using DFF were harder (as seen with Konig and pencil hardness) than CHDA coatings and showed better solvent resistance regardless of the resin used. Notably, solvent resistance of the ambient-cured DFF formulations were 3× higher than 1 week ambient-cured CHDA formulations regardless of resin. Solvent resistance improved for the formulations after expedited cure, although the DFF formulations reached over 400 double rubs. Expedited cured formulations reached as high as H pencil hardness, yet expedited cure did not improve the hardness of the CHDA coatings. Solvent resistance improved for formulations after expedited cure. Gel content of the ambient-cured networks showed ~30% higher extractable content for the coatings crosslinked with CHDA compared the coatings crosslinked with DFF. The oven cure reduced the extractable content for the CHDA formulations and DFF-CMSSP, indicating that further crosslinking had occurred. The oven cured DFF-TCAP showed a mild increase, however it still had less extractable content than CHDA formulations. This demonstrates that DFF is generating more crosslinks with the carbamate resins both under ambient and under thermal cure than CHDA. These results indicate that DFF networks cured under ambient or expedited cure overall perform better than CHDA regardless of polycarbamate resins used.

TABLE 4

Standard Characterizations of Non-Isocyanate Polyurethanes

| Formulation | Curing Conditions | Thickness (μm) | Konig Hardness (s) | Pencil | Xhatch | Rev. Impact (in-lbs) | MEK DRs | Tack Free (min) | Gel % |
|---|---|---|---|---|---|---|---|---|---|
| DFF-CMSSP | Ambient (1 week/3 months) | 37.3 ± 3 | 122/127 | HB/F | 0B/0B | <3.92 | 116/225 | 8 | 91.4 |
|  | 120° C. | 27.9 ± 3 | 135 | H | 0B | <3.92 | >400 | N/A | 96.6 |
| DFF-TCAP | Ambient (1 week/3 months) | 38.2 ± 2 | 131/137 | HB/F | 0B/0B | <3.92 | 160/>400 | 6 | 94.0 |
|  | 120° C. | 34.6 ± 4 | 131 | H | 0B | <3.92 | >400 | N/A | 87.3 |
| CHDA-CMSSP | Ambient (1 week/3 months) | 32.3 ± 2 | 70/143 | 2B/HB | 0B/4B | <3.92 | 44/200 | 7 | 67.5 |
|  | 120° C. | 35.1 ± 2 | 101 | 2B | 0B | <3.92 | 196 | N/A | 75.0 |
| CHDA-TCAP | Ambient (1 week/3 months) | 28.9 ± 3 | 116/115 | HB/2B | 0B/3B | <3.92 | 49/44 | 12 | 64.4 |
|  | 120° C. | 25.7 ± 2 | 81 | HB | 0B | <3.92 | 190 | N/A | 80.9 |

Since aluminum can be a challenging substrate for adhesion, coatings were also prepared on iron phosphate treated steel panels and cured for 2 hours at 120° C. Adhesion was excellent and impact improved as well, as is shown in Table 5.

TABLE 5

Adhesion and flexibility for coatings cured for 2 hours at 120° C. on iron phosphate pretreated steel.

| Formulation | Crosshatch Adhesion | Impact Resistance (For/Rev, in-lbs) |
|---|---|---|
| DFF-CMSSP | 4B | 78.4/<3.92 |
| CHDA-CMSSP | 5B | 86.2/11.8 |
| DFF-TCAP | 5B | 94.1/15.7 |
| CHDA-TCAP | 5B | 98.0/11.8 |

Conclusions

Soybean oil-derived alkyd and ESS polycarbamates were synthesized and ambiently cured with biomass and petrochemically-derived dialdehydes to form non-isocyanate polyurethanes of varying biobased content. The coatings demonstrated hardness, solvent resistance, and glass transitions from 67-91° C. when cured ambiently over 3 months. Expedited cure showed increases in $T_g$ for almost all the coatings, with the alkyd polycarbamate and DFF reaching as high as 149.9° C. DFF-crosslinked coatings surpassed CHDA-crosslinked coatings in terms of hardness and solvent resistances regardless of resin. However, all the coatings showed brittleness and the DFF coatings imposed a color. The invention demonstrates that dialdehydes prepared from renewable furanics can be ambiently crosslinked with bio-derived polycarbamates to make polyurethanes that surpass the standard performance of those with a widely utilized and petrochemically-derived dialdehyde. This invites unique architectures that biomass-derived materials can provide to be used to form completely bioderived polyurethanes.

References:

1. Raquez, J. M., Deléglise, M., Lacrampe, M. F., & Krawczak, P. "Thermosetting (bio) materials derived from renewable resources: a critical review." *Prog. Polym. Sci.* 2010, 35(4), 487-509.

2. Guan, Jing, et al. "Progress in study of non-isocyanate polyurethane." *Ind. Eng. Chem. Res.* 2011, 50.11, 6517-6527.

3. Maisonneuve, L., Lamarzelle, O., Rix, E., Grau, E., & Cramail, H. "Isocyanate-free routes to polyurethanes and poly (hydroxy urethane)s." *Chem. Rev.,* 2015, 115.22, 12407-12439.

4. Ihata, O., Kayaki, Y, Ikariya, T. "Synthesis of Thermoresponsive Polyurethane from 2-Methylaziridine and Supercritical Carbon Dioxide." *Angew. Chem. Int. Ed.,* 2004, 43.6, 717-719.

5. Brocas, A, Cendejas, G., Caillol, S., Deffieux, A., Carlotti, S. "Controlled synthesis of polyepichlorohydrin with pendant cyclic carbonate functions for isocyanate-free polyurethane networks." *J. Polym. Sci., Part A: Polym. Chem.* 2011, 49.12, 2677-2684.

6. Webster, D C., Crain, A. "Synthesis and applications of cyclic carbonate functional polymers in thermosetting coatings." *Prog. Org. Coat.,* 2000, 40.1-4, 275-282.

7. Webster, D C. "Cyclic carbonate functional polymers and their applications." *Prog. Org. Coat,* 2003, 47.1, 77-86.

8. Datta, J.; Włoch, M. "Progress in non-isocyanate polyurethanes synthesized from cyclic carbonate intermediates and di- or polyamines in the context of structure-properties relationship and from an environmental point of view." *Polym. Bull.* 2015, 73 (5), 1459-1496.

9. Ubaghs, L.; Keul, H.; Höcker, H. "Novel intramolecular blocked isocyanates as stable one-component systems for poly (urea urethane)s." *Polym.* 2005, 46 (5), 1459-1465.

10. Kwolek, S L., Morgan, P W. "Preparation of polyamides, polyurethanes, polysulfonamides, and polyesters by low temperature solution polycondensation." *J. Pol. Sci. Gen. Pap,* 1964, 2.6, 2693-2703.

11. Delebecq, E, Pascault, J P, Boutevin, B, Ganachaud, F. "On the versatility of urethane/urea bonds: reversibility, blocked isocyanate, and non-isocyanate polyurethane." *Chem. Rev.,* 2012, 113, 80-118.

12. Cornille, A.; Auvergne, R.; Figovsky, O.; Boutevin, B.; Caillol, "A perspective approach to sustainable routes for non-isocyanate polyurethanes." *S. Eur. Polym. J.* 2017, 87, 535-552.

13. Argyropoulos, J N., et al. "Ambient temperature curable isocyanate-free compositions for preparing crosslinked polyurethanes." U.S. Pat. No. 8,653,174B2, Feb. 18, 2014.

14. Anderson, Jeff R., et al. "Crosslinkable composition, a method of making the same and a crosslinked composition produced therefrom." U.S. Pat. No. 9,580,622B2, Feb. 28, 2017.

15. Spilman, Gary E., et al. "Crosslinkable coating composition and method of producing the same." U.S. Pat. No. 9,822,280B2, Nov. 21, 2017.

16. Popa, Paul J., et al. "Cross-linkable coating composition and method of producing the same." U.S. Pat. No. 9,604,721B2, Mar. 28, 2017.

17. Kamber, Nahrain E., et al. "Ambient cure compositions for making coatings having humidity and corrosion resistance and methods of use." US 20180022956A1, Jan. 25, 2018.

18. Li, Y., Popa, P J., Argyropoulos, J N., Hofmann, S. and Drumright, R E. "Coating system, a method of applying the coating system and an article comprising the coating system." U.S. Pat. No. 9,718,990B2, Oct. , 12, 2017.

19. Amarasekara, A S.; Green, D.; Williams, L D. "Renewable resources based polymers: Synthesis and characterization of 2, 5-diformylfuran-urea resin." *Eur. Polym. J.* 2009, 45(2), 595-598.

20. Moreau, C.; Belgacem, M N.; Gandini, A. "Recent catalytic advances in the chemistry of substituted furans from carbohydrates and in the ensuing polymers" *Topics in Cat.,* 2004, 35 (31).

21. Jang, N R.; Kim, H R.; Hou, C T.; Kim, B S, "Novel biobased photo-crosslinked polymer networks prepared from vegetable oil and 2,5-furan diacrylate." *Polym. Adv. Tech.* 2013, 24 (9), 814-818.

22. lkezaki, T.; Matsuoka, R.; Hatanaka, K.; Yoshie, N. "Biobased poly(2,5-furandimethylene succinate-co-butylene succinate) crosslinked by reversible Diels-Alder reaction." *J. Polym. Sci., Part A: Polym. Chem.* 2013, 52 (2), 216-222.

23. Pan, X, Sengupta, P, Webster, D C."Novel biobased epoxy compounds: epoxidized sucrose esters of fatty acids." *Green Chem.,* 2011, 13.4, 965-975.

24. Pan, X, Sengupta, P, Webster, D C. "High biobased content epoxy-anhydride thermosets from epoxidized sucrose esters of fatty acids." *Biomac.,* 2011, 12.6, 2416-2428.

25. Yan, J, Webster, D C."Thermosets from highly functional methacrylated epoxidized sucrose soyate." *Green Mat.,* 2014, 2.3, 132-143.

26. Kovash, C S.; Pavlacky, E.; Selvakumar, S.; Sibi, M P.; Webster, D C."Thermoset coatings from epoxidized sucrose soyate and blocked, bio-based dicarboxylic acids." *ChemSusChem* 2014, 7 (8), 2289-2294

27. Monono, E. M.; Webster, D. C.; Wiesenborn, D. P. "Pilot scale (10 kg) production and characterization of epoxidized sucrose soyate." *Ind. Crops and Prod.,* 2015, 74, 987-997.

28. Monono, E. M.; Bahr, J. A.; Pryor, S. W.; Webster, D. C.; Wiesenborn, D. P. "Optimizing process parameters of epoxidized sucrose soyate synthesis for industrial scale production." *Org. Process Res. Dev.* 2015, 19 (11), 1683-1692.

29. Nelson, T J.; Masaki, B.; Morseth, Z.; Webster, DC."Highly functional biobased polyols and their use in melamine-formaldehyde coatings." *J. Coat. Tech and Res.* 2013, 10.6, 757-767.

30. Adamopoulos, Lambrini. "Understanding the formation of sugar fatty acid esters." NC State University Libraries. Master's Thesis in Wood and Paper Science. Aug. 4, 2006.

31. Murillo, E. A.; Vallejo, P. P.; López, B. L. "Synthesis and characterization of hyperbranched alkyd resins based on tall oil fatty acids." *Prog. Org. Coat.,* 2010, 69.3, 235-240.

32. Spasojević, P. M., et al. "High performance alkyd resins synthesized from postconsumer PET bottles." *Advances,* 2015, 5.76, 62273-62283.

33. Pan, Xiao, Webster, D C. "New biobased high functionality polyols and their use in polyurethane coatings" *Chem. Sus. Chem.,* 2012, 5.2, 419-429.

34. Jones, Frank N., Mark E. Nichols, and Socrates Peter Pappas. Organic coatings: science and technology. John Wiley & Sons, 2017. Page 76.

The claimed invention is:

1. A curable non-isocyanate polyurethane coating composition comprising a reaction product of:
    a) a polycarbamate resin; and
    b) a dialdehyde,
wherein the polycarbamate resin is a transcarbamoylated methoxy sucrose polyol or a transcarbamoylated soybean oil alkyd polyol.

2. The composition of claim 1, wherein the polycarbamate resin comprises the reaction product of a polyol resin and a carbamate.

3. The composition of claim 2, wherein the polyol resin is a methoxy sucrose soyate polyol or a soybean oil alkyd polyol.

4. The composition of claim 3, wherein the methoxy sucrose soyate polyol comprises a reaction product of epoxidized sucrose soyate and methanol.

5. The composition of claim 3, wherein the soybean oil alkyd polyol comprises a reaction product of soybean oil and pentaerythritol.

6. The composition of claim 2, wherein the carbamate is methyl carbamate.

7. The composition of claim 1, wherein the dialdehyde is bio-derived or petro-derived.

8. The composition of claim 7, wherein the petro-derived dialdehyde is 1,4- cyclohexane dicarboxaldehyde.

9. The composition of claim 7, wherein the bio-derived dialdehyde is 2,5- diformylfuran.

10. A cured coating composition, wherein the composition of claim 1 is cured at ambient conditions or by heating.

11. An object coated with the cured coating composition of claim 10.

12. A method of making a curable non-isocyanate polyurethane coating composition comprising reacting a polycarbamate resin with a dialdehyde,
    wherein the polycarbamate resin is a transcarbamoylated methoxy sucrose polyol or a transcarbamoylated soybean oil alkyd polyol,
    wherein the polycarbamate resin comprises the reaction product of a polyol resin and a carbamate.

13. The method of claim 12, wherein the polyol resin is a methoxy sucrose soyate polyol or a soybean oil alkyd polyol.

14. The method of claim 13, wherein the methoxy sucrose soyate polyol comprises the reaction product of epoxidized sucrose soyate and methanol.

15. The method of claim 13, wherein the soybean oil alkyd polyol comprises the reaction product of soybean oil and pentaerythritol.

16. The method of claim 12, wherein the carbamate is methyl carbamate.

17. The method of claim 12, wherein the dialdehyde is bio-derived or petro-derived.

18. The method of claim 17, wherein the petro-derived dialdehyde is 1,4-cyclohexane dicarboxaldehyde.

19. The method of claim 17, wherein the bio-derived dialdehyde is 2,5-diformylfuran.

* * * * *